United States Patent [19]
Foxhall

[11] 3,720,224
[45] March 13, 1973

[54] TIRE PRESSURE INDICATOR AND INFLATION DEVICE

[75] Inventor: Ollie C. Foxhall, Bethany, Okla. Street, Bethany, Okla. 73008

[73] Assignee: Joco Incorporated, Oklahoma City, Okla.

[22] Filed: Dec. 18, 1970

[21] Appl. No.: 99,631

[52] U.S. Cl..................................137/227, 73/146.8
[51] Int. Cl. .........................B60c 23/04, F16k 37/00
[58] Field of Search.....73/146.8; 116/34 R; 137/227, 137/229; 138/89.2; 152/429

[56] References Cited

UNITED STATES PATENTS

| | | | |
|---|---|---|---|
| 2,903,888 | 9/1959 | Gjoll | 73/146.8 |
| 3,592,218 | 7/1971 | Guy | 137/227 |
| 3,236,097 | 2/1966 | Tessmer | 73/146.8 |
| 2,007,916 | 7/1935 | Kastner | 152/429 |
| 3,224,264 | 12/1965 | Becciani et al. | 73/146.8 |

Primary Examiner—Louis R. Prince
Assistant Examiner—Daniel M. Yasich
Attorney—Dunlap, Laney, Hessin & Dougherty

[57] ABSTRACT

A tire pressure indicator and inflation device which includes an outer housing having a bore and counterbore formed therein, and an internal housing positioned in the bore of the outer housing. The internal housing is constructed of resilient material, and has an internally threaded hollow interior for connecting the internal housing to the stem of the valve of a pneumatic tire. The internal housing is generally cylindrical in shape and is resiliently collapsible in an axial direction. The internal housing has an end plate which extends across and closes one end thereof and which carries a valve core depressor element. An elongated pressure indicator element carrying a piston at one end thereof is slidably mounted within the bore of the outer housing so that the piston seals against the internal wall of the outer housing in the bore. The piston and associated pressure indicator element are biased by a spring positioned between the piston and an internal shoulder on the outer housing to a position adjacent the internal housing.

3 Claims, 7 Drawing Figures

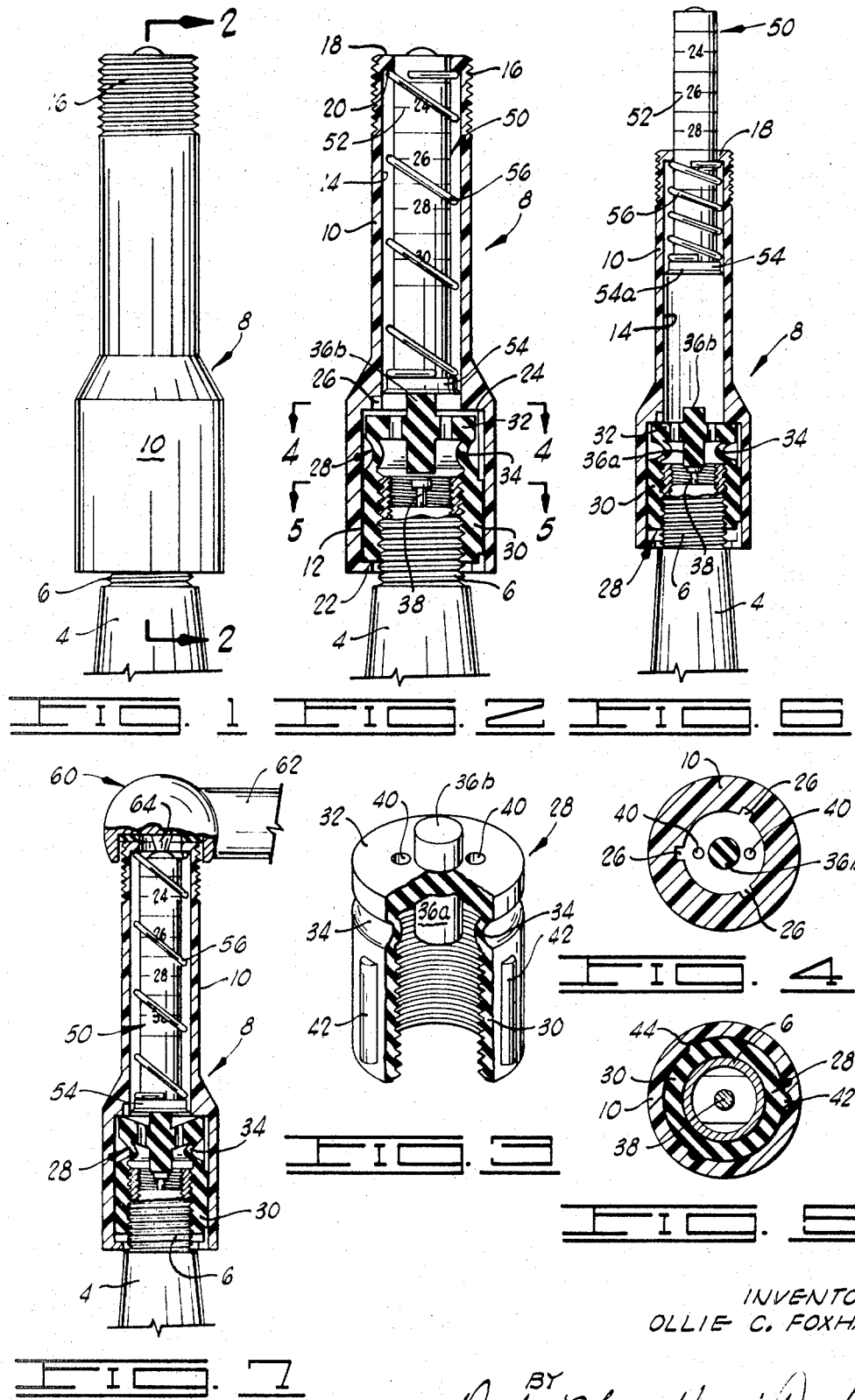

TIRE PRESSURE INDICATOR AND INFLATION DEVICE

BACKGROUND OF THE INVENTION

1. Field of the Invention

This invention relates to the field of pneumatically actuated pressure gauges, and more particularly, to structures for use in connection with pneumatic tires, and including, in combination, a pneumatic pressure indicator and an inflation valve facilitating inflation of the tire.

2. Brief Description of the Prior Art

The use of automobiles having pneumatic ground engaging tires has greatly increased throughout the world in recent years. Optimum operation of these vehicles requires proper care of tires by which they contact the ground. Proper care of tires entails operation of the vehicle with optimum pneumatic pressure maintained within the tires at all times.

To the end of permitting pneumatic tire life to be extended, and to facilitate the ease with which the vehicle operator may maintain a constant awareness of the status of pneumatic pressure within the tires of his vehicle, a great many devices have been heretofore proposed for constantly indicating to the vehicle operator or to service station personnel, the pneumatic pressure obtaining within the tire. The efforts to provide a device which will perform this function have yielded mechanisms ranging in complexity from simple pressure responsive screw-on indicators of few parts, which provide a visual indication of pressure within the tire to one standing beside the tire, to remote control devices which, by the use of complicated and expensive electrical or pneumatic circuitry, undertake to provide a continuous indication to the operator of pressure in the tires during operation of the vehicle, by communicating a visual signal to the instrument panel or dashboard of the vehicle.

The pressure indicator devices generally function in cooperation with the conventionally provided valve stem, which projects outwardly from the periphery of the tire as manufactured and which functions to facilitate inflation of the tire, and checking of pressure by the use of hand gauges carried by service station operators. Because of this cooperation, which usually takes the form of screwing or attaching the continuously indicating pressure gauge to the valve stem, it is necessary with many of the simpler pressure indicating devices, as well as with a great many of the more complicated ones, to detach or disconnect the pressure indicating device from the valve stem when it is necessary to inflate or deflate the tire. Stated differently, devices of this type, as they have been very often proposed, do not provide any way by which the tire pressure can be adjusted without the removal of the continuously indicating pressure gauge from the tire.

There have been, from time to time, attempts to alleviate the inconvenience of removing the pressure indicating device or gauge from the valve stem for the purpose of inflating or deflating the tire. In general, the efforts to overcome this disadvantage, based in the necessity for such removal, have taken the form of incorporating some type of depressible auxiliary valve stem or core within the pressure gauge or indicator, so that when a conventional inflation chuck carried at the end of an air hose is pressed over a portion of the air gauge to depress the auxiliary valve stem carried therein, ports are opened which place the chuck in pneumatic communication with the interior of the tire and permit inflation to proceed in the normal manner.

Despite the fact that, over many years, there have been a great many patents issued upon a wide assortment of pressure indicating devices, and upon such devices in combination with auxiliary inflation structure, one still does not, to this day, perceive any widespread acceptance or use of either a simple pressure gauge for continuously indicating tire pressure at a glance, or the more sophisticated devices which combine an inflation function with a pressure indication function. The absence of these devices from the field of actual usage seems only attributable to either the lack of mechanical reliability, and a relatively short service life of the devices, or to the fact that the cost of manufacturing the more sophisticated and intricate devices prices them beyond the market. It is submitted that the desire of vehicle operators and service station personnel for this convenience and assurance of proper tire care is such that, while such devices are desirable, and would admittedly make a valuable contribution to tire maintenance and vehicular safety, the interest and desire to obtain these objectives more effectively than at present has not, to the present date, warranted the cost of acquiring and installing those devices which can be depended on to reliably perform the functions sought.

BRIEF DESCRIPTION OF THE PRESENT INVENTION

The present invention provides a relatively simple and inexpensively constructed pressure gauge and tire inflation device which is believed to be more simple and less costly than any known to the prior art which are capable of performing equivalent functions. The apparatus of the present invention is simple to the extent of consisting of only four parts or elements which can be easily and quickly assembled (manually, if desired). Each of the four parts is ruggedly constructed, and the device as a whole, when assembled, performs effectively to accurately provide an indication at any time of pressure within a pneumatic tire, and to facilitate inflation of the tire with even greater ease than the tire may be inflated when using the valve stem provided as original integrated equipment forming a portion of the tire.. Other advantageous aspects characterize the invention which achieve several important objectives, and such objectives and advantageous aspects are more particularly hereinafter described.

Structurally, the pressure indicator and tire inflation device of the invention may be broadly described as including an outer housing, an inner housing, an elongated pressure indicator element carrying a piston at one end thereof, and a spring positioned between the piston and outer housing. The outer housing includes a relatively large diameter cylindrical bore which intersects an elongated, relatively smaller diameter bore. The outer housing is open at its opposite ends. The inner housing is a hollow cylindrical element made of a resilient material, and is positioned within the relatively large diameter bore of the outer housing. The inner housing has a fluid transmissive end plate extending across and closing one end thereof, and a generally cylindrical side wall connected to the end plate through a deformable portion. The generally cylindrical side wall of the inner housing is keyed to the wall of the outer housing to prevent rotation of the inner housing within a bore of the outer housing. Projecting in opposite directions from the opposite sides of the fluid transmissive end plate which extends across and closes one end of the inner housing are a pair of core depressor projections. The core depressor projection which projects outwardly or away from the inner housing, and into the bore formed in the outer housing, contacts the face of the piston carried on the end of the elongated pressure indicator element. The piston is slidably and sealingly positioned within the counterbore of the outer housing and forms a stop against which abuts one end of a helical spring positioned within this bore. The opposite end of the spring contacts an internal shoulder formed by an inturned flange located at the end of the bore within the external housing.

In the use of the device, the internal housing is screwed on the externally threaded valve stem conventionally provided in conjunction with the tire. The external housing can then be moved relative to the internal housing to deform the resilient material of the internal housing in such a way that the valve core depressor projection which projects into the internal housing will contact the valve core of the regular tire valve. This movement opens this valve to permit the existing air pressure within the tire to be communicated to the under side of the piston forming a portion of the pressure indicator and inflation device of the invention. The elongated pressure indicator element is then forced out of the external housing to an extent which is correlated to the air pressure within the tire. The pressure indicator element functions also as a valve core when an air inflation chuck is placed over the end of the external housing which carries the bore. Depression of the pressure indicator element by the core depressor projection of the chuck moves the piston to a position allowing pneumatic communication between the inflation chuck and the interior of the tire.

A broad object of the invention is to provide an inexpensive yet efficiently functioning and easily used device for quickly and accurately indicating at any time, the inflation pressure of a pneumatic tire to which the device is attached, and to permit, at any time and without detachment of the device from the tire, the inflation or deflation of the tire to a desired pressure level.

Another object of the invention is to provide a combination pressure gauge and tire inflation device which can be used, as a result of its geometry, to effectively extend the overall length of the valve provided with pneumatic tires for the purpose of inflating or deflating the tires, thereby improving access to the valve for purposes of tire inflation.

A more specific object of the invention is to provide a device for quickly and easily providing an accurate indication of the pressure carried in a pneumatic tire, and to permit inflation and deflation of the tire at any time without the necessity for removing the device from the valve stem of the tire.

Another object of the invention is to provide a pressure indicating and inflation device which can be easily installed on the valve stems of pneumatic tires, even under conditions where such valve stems have become retracted within chrome disks or hub caps carried by the wheels of a vehicle upon which the tires are mounted.

Yet another object of the invention is to provide a combination pressure indicating and tire inflation device which can be quickly and easily adjusted in its structural make-up to adapt the device to the measurement of widely varying pressure ranges as are experienced with different types of pneumatic tires, different vehicle operator preferences, and different types of over-the-road vehicles.

A specific object of the invention is to provide a combination pressure gauge and inflation device which is simple in structure and to the extent of being reduced to the inclusion of only four parts, which four parts can be manually assembled in less than one minute.

Other objects and advantages of the invention will become apparent as the following detailed description of the invention is read in conjunction with the accompanying drawings which illustrate the invention.

BRIEF DESCRIPTION OF THE DRAWINGS

FIG. 1 is a side elevation view of the combination pressure indicator and inflation device of the invention as the device appears when mounted on the valve stem of a pneumatic tire.

FIG. 2 is a longitudinal sectional view of the pressure indicator and inflation device depicted in FIG. 1 with such section being taken along the line 2—2 of FIG. 1.

FIG. 3 is a perspective view of the inner housing constituting one element of the pressure indicating and inflation device of the invention, with a part of the inner housing broken away to show more clearly the appearance of the interior thereof.

FIG. 4 is a sectional view taken along line 4—4 of FIG. 2.

FIG. 5 is a sectional view taken along line 5—5 of FIG. 2.

FIG. 6 is a sectional view similar to FIG. 2, but showing the pressure indicator and inflation device of the invention as it appears when it is in a status effective to permit the inflation pressure of a pneumatic tire to which it is attached to be measured.

FIG. 7 is a view similar to FIG. 6, but showing an alternate status of the pressure indicator and inflation device as the device is positioned for the purpose of inflating a tire to which it is attached.

DETAILED DESCRIPTION OF A PREFERRED EMBODIMENT OF THE INVENTION

Referring initially to FIG. 1 of the drawings, shown therein is a conventional rubber coated valve stem 4 of the type which is provided on pneumatic tires as now manufactured and sold for use on automobiles. The valve stem 4 has an externally threaded outer end portion 6 which is provided for the securement of a valve cap thereto in normal usage. To facilitate the mounting of the present invention on the valve core 4, the conventional valve cap has been removed from the externally threaded portion 6, and the pressure indicator inflation device of the present invention has been threadedly secured to the valve stem 4 and is designated generally by reference numeral 8. The pressure indicator inflation device includes an outer housing 10. The outer housing 10 is enlarged at one end to accommodate interiorly thereof, a relatively large diameter bore or counterbore 12. At its other end, a relatively small diameter portion of the outer housing 10 accommodates a relatively small diameter bore 14. At the opposite end of the housing from the enlarged portion in which the bore 12 is located, the outer housing 10 is externally threaded with threads 16 to accommodate a valve cap (not shown). The purpose and usage of such valve cap will be well understood in the art.

In referring to FIG. 2 of the drawings, it will also be perceived that the outer housing 10 is provided with an inturned flange 18 at the end thereof which carries the threads 16, such inturned flange providing a downwardly facing shoulder 20 disposed within the bore 14. At its end opposite the end carrying the threads 16, the outer housing 10 also carries a second inturned flange 22. The purposes of the inturned flanges 18 and 22 will be hereinafter explained in greater detail. At the intersection of the bore 12 with the bore 14, the outer housing 10 forms a downwardly facing shoulder 24, and it will be noted in referring to FIG. 4 that the annular shoulder 24 is partially relieved at three points therearound to provide passageways 26 which, during the operation of the device as explained hereinafter, provide air flow channels between the bore 14 and the bore 12. Although the outer housing 10 may be constructed of various materials, it is preferably constructed of a synthetic resin having elastomeric properties and relatively high mechanical strength.

Positioned within the outer housing 10 in the bore 12 is an inner housing designated generally by reference numeral 28. The inner housing 28 includes a cylindrical side wall 30 which carries an internal thread facilitating the threading of the inner housing upon the threaded portion 6 of the valve stem 4. The inner housing 28 further includes at one end thereof an end plate 32 which extends across and closes the end of the inner housing. Interconnecting the end plate 32 and the cylindrical side wall 30 is a relatively thin deformable portion 34.

The end plate carries a pair of aligned valve core depressor projections 36a and 36b. The valve core depressor projection 36a will be referred to as the interior projection, and it projects into the hollow interior of the inner housing 28 into proximity to the conventional valve core 38 carried by, and forming a portion of, the conventional valve stem 4 of the tire. The outer valve core depressor projection 36b projects from the inner housing 28 into the bore 14 formed in the outer housing 10. One or more ports or passageways 40 (two being shown in the illustrated embodiment of the invention) are formed through the endplate 32 for a purpose hereinafter described.

The cylindrical side wall 30 of the inner housing 28 carries a plurality of axially extending ribs 42, which ribs register with complementary grooves 44 formed in the internal wall of the enlarged end portion of the outer housing 10 as best illustrated in FIG. 5.

The inner housing 28 is preferably a unitary or integrally formed unit which is fabricated from an elastomeric material, such as rubber. The elastic properties of the material used are particularly important to the proper functioning of the inner housing 28 in the overall operation of the pressure indicator and inflation device 8 of the invention, and it is important that the deformable portion 34 be more easily collapsed or more yieldable than the remaining portions of the inner housing 28. The inner housing 28 is snugly fitted within the outer housing 10 so that the cylindrical side wall 30 preferably frictionally engages the internal wall which defines the bore 12. It will be noted that in the relaxed or inoperative position of the pressure indicating and inflation device 8 as shown in FIG. 2, some clearance exists between the end plate 32 and the shoulder 24 of the outer housing 10. There is also clearance between the outer periphery of the end plate 32 and the cylindrical boundary wall of the bore 12 within the outer housing 10.

Positioned within the bore 14 of the outer housing 10 is an elongated pressure indicator element designated generally by reference numeral 50. The pressure indicator element is cylindrical in configuration and of substantially smaller diameter than the diameter of the bore 14. It is also apparent that the diameter of the pressure indicator element 50 permits it to project through the opening in the flange 18 at one end of the outer housing 10. The pressure indicator element 50 carries a series of graduations 52 and other indicia to provide a scale which may be read in a manner hereinafter described to ascertain the air pressure within the tire.

At its internal end which is located most nearly to the inner housing 28, the elongated pressure indicator element 50 carries a cylindrical piston 54. The cylindrical piston 54 is provided adjacent its face with an annular, resilient sealing member 54a which sealingly contacts the internal wall of the housing 10 which defines the bore 14. The sealing member 54a thus maintains sealing contact with the housing 10 during reciprocating axial movement within the housing of the elongated pressure indicator element 50 and piston 54.

In a preferred construction of the pressure indicator and inflation device 8 of the invention, the elongated pressure indicator element 50 and the piston 54 are integrally formed and are preferably fabricated or manufactured from a hard elastomeric material such as hard rubber. Other materials may be used, however, and though such construction is less desirable, the piston 54 may be manufactured as an element which is separate from the elongated pressure indicator element 50, and which is secured thereto by an adhesive or suitable fastening devices.

Positioned around the elongated pressure indicator element 50 and within the annulus formed between this element and the housing 10 is an elongated helical compression spring 56. The elongated compression spring 56 has one of its ends in abutting contact with the upper side of the piston 54. The opposite end of the spring 56 bears against the shoulder 20 constituting the under side of the inturned flange 18. In the position on the pressure indicator and inflation device 8 depicted in FIG. 2, the device is in its at rest or inoperative position, and in this position, the spring 56 is under slight compression and resiliently biases the elongated pressure indicator element 50 and the piston 54 attached thereto to a position such that the face of the piston bears against the upper end of the outer valve core depressor projection 36b. Sufficient pressure is not exerted by the spring 56, however, to deform any portion of the inner housing 28 from its normal unstressed configuration.

OPERATION

In the use of the pressure indicator and inflation device 8 of the invention, the device is first screwed down upon the threads 6 of the valve core 4 to a position such that the innervalve core depressor projection 36a is spaced slightly from the valve core 38. With the pressure indicator and inflation device 8 thus attached to the valve stem 4, the assembly appears as depicted in FIGS. 1 and 2 of the drawings.

For the purpose of checking the air pressure within the tire which carries the valve stem 4, the vehicle operator or service station attendant may then grip the outer housing 10 of the device 8 and force the outer housing toward the valve stem 4. This application of force causes relative movement between the outer housing 10 and the inner housing 28 which is threaded upon the threads 6 of the valve stem 4. As the outer housing 10 moves upon the inner housing 28, the shoulder 24 inside the outer housing 10 comes in contact with the end plate 32 of the inner housing 28. Further movement of the outer housing 10 then causes resilient deformation of the deformable portion 34 of the inner housing 28 and concurrently causes the end plate 32 and the valve core depressor projections 36a and 36b which it carries to move toward the valve stem 4. This movement brings the inner valve core depressor projection 36a into contact with the valve core 38 and depresses the valve core to open the valve of the tire in a manner well understood in the art. This opening of the valve located within the valve stem 4 places the interior of the tire which carries the valve stem in pneumatic communication with the interior of the inner housing 28. Air may thus flow through the inner housing 28 and through the passageways 40 formed in the end plate 32 thereof into the outer housing 10.

The air pressure present within the tire thus comes to act against the face of the piston 54, and this piston is forced by air pressure outwardly within the bore 14. In undergoing an outward movement in the bore 14, the piston 54 forces the elongated pressure indicator element 50 ahead of it, so that the pressure indicator element is extended outwardly from the relatively small diameter end of the outer housing 10. Concurrently with this movement, the helical compression spring 56 undergoes compression and increasingly opposes the pressure developed against the face of the piston 54 by pneumatic pressure acting from within the tire. Eventually, a point of balance between the bias of the spring 56 and the pneumatic pressure within the tire is reached, and movement of the piston 54 and the elongated pressure indicator element 50 ceases. Stated differently, an equilibrium position is reached in which an amount of the elongated pressure indicator element 50 extends out of the outer housing 10 which can be correlated to the air pressure which is present within the tire. It will, at this time, be possible to read the graduations 52 upon the pressure indicator element 50 to determine the air pressure present within the tire. The described status of the pressure indicator and inflation device 8 of the invention is depicted in FIG. 6 where an air pressure reading of 27 pounds is being registered by the elongated pressure indicator element.

When the outer housing 10 is released after it has been moved downwardly relative to the inner housing 28 to obtain a pressure reading, the inner housing 28 will expand due to the resiliency of the material from which it is constructed, and the relative positions of the inner and outer housings as depicted in FIG. 2 will be re-established. This is an equilibrium position in which the forces exerted by the spring 56 and inner housing 28 through the outer valve core depressor 36b position the piston 54 as shown in FIG. 2. At this time, the air which is entrapped within the outer housing 10 beneath the piston 54 may slowly bleed from the outer housing by passage around the outer periphery of the end plate 32 and by the deformable portion 34, and past the cylindrical side wall 30. It will thus be come possible, soon after a pressure reading has been taken, to press the outer end of the elongated pressure indicator element 50 down into the bore 14 of the outer housing 10 to reset the device either for a subsequent pressure reading, or for inflation or deflation of the tire.

The manner in which the pressure indicator and inflation device 8 of the invention is utilized for inflating or deflating the tire is best illustrated in FIG. 7 of the drawings. As is customary for the purpose of tire inflation a tire inflation chuck, designated generally by reference numeral 60, is utilized, such chuck being carried on the end of a pneumatic pressure hose 62. The construction of a chuck of this type is such that a core depressor element 64 is provided in the center of the chuck, and functions to depress a valve core to permit injection of air under pressure to proceed.

When the chuck 60 is used to inflate a tire through the pressure indicator and inflation device 8 of the present invention, the chuck is placed over the device so that a portion of the chuck bears against the outer housing 10 and forces this housing downwardly on the inner housing 28 until the shoulder 24 comes in contact with the end plate 32. Concurrently with this movement, the core depressor element 64 comes in contact with the end of the elongated pressure indicator element 50 which is adjacent the flange 18 of the outer housing 10. The pressure indicator element 50 is forced inwardly by the core depressor element 64 of the chuck 60, and in being forced inwardly, carries the piston 54 attached to its inner end toward the bore 12 in the outer housing 10.

The movement of the pressure indicator element 50 is such that the piston 54 and the sealing element 54a which it carries are moved in line with, or slightly past, the passageways 26 formed in the shoulder 24 of the outer housing 10. When the piston 54 and sealing element 54a have reached this position, pneumatic communication exists between the annulus around the elongated pressure indicator element 50 and the passageways 40 formed in the end plate 32 of the inner housing 28. This status of the pressure indicator and inflation device 8 is shown in FIG. 7.

As is well understood in the art, the described contact between the core depressor element 64 and the elongated pressure indicator element 50 permits air under relatively high pressure to flow from the air chuck 60 into the open annulus which surrounds the pressure indicator element 50 within the outer housing 10. This pressurized air flows through the passageways 26 in the shoulder 24 and through the passageways 40 in the end plate 32. The described movement of the pressure indicator element 50 and the piston 54 has effectively moved the inner valve stem depressor projection 36a against the valve core 38 of the valve stem 4 to open the tire valve at this time. Thus the pressurized air is free to flow into the tire and increase the inflation pressure.

It is believed that, from the description of the procedure of inflating the tire through the pressure indicator and inflation device 8 of the present invention, it will now be apparent how deflation may be accomplished. The elongated pressure indicator element 50 is again pushed inwardly within the outer housing 10 by any suitable means until the status depicted in FIG. 7 is attained. Since communication is, at this time, established between the interior of the tire and the annulus which surrounds the pressure indicator element 50, air under pressure from the tire is free to flow outwardly to the atmosphere to deflate the tire, or to reduce the pressure therein.

From the foregoing description of the invention it will have become apparent that a relatively simple, reliable and efficient pressure indicator and inflation device has been proposed by the invention. It is pointed out that only four integral parts are required in the construction of the device of the invention, and that these parts may be quickly and easily assembled manually. In the manual assembly sequence, the spring 56 is first placed around the elongated pressure indicator element 50 with one of its ends bearing against the piston 54. The thus assembled spring and pressure indicator element are then inserted through the opening in the enlarged end of the outer housing 10, and allowed to drop through the outer housing until the spring comes to rest against the flange 18, and the pressure indicator element 50 is thus positioned predominantly within the bore 14 of the outer housing. The inner housing 28 may then be pressed through the opening in the enlarged end of the outer housing 10 until it snaps into place with the inturned flange 22 hooking over the end of the inner housing 28 adjacent the open end of the outer housing. In pressing the inner housing 28 into position, the outer depressor projection 36b carried on the end plate 32 will force the piston 54 into the bore 14 against the opposition of the compression spring 56. Thus, the proper balance of forces is achieved, and the status of the assembly shown in FIG. 2 is accomplished.

It may be pointed out that one of the advantages of the present invention is that the overall length of the pressure indicator and inflation device 8 of the invention permits a retracted or withdrawn valve core 4 to be reached while gripping the device 8 at the threaded end 16 thereof. The device 8 may be screwed upon the valve core 4 when it is so reached because the ribs 42 key the inner housing 28 to the outer housing 10 in such manner as to prevent rotation of the inner housing within the outer housing.

Although a specific embodiment of the invention has been herein described in order to fully illustrate the principles of operation which underlie the invention, it is to be understood that various changes and modifications can be effected in the structures described without departure from these basic principles. Changes and innovations of this type are therefore deemed to be circumscribed by the spirit and scope of the invention except as the same may be necessarily limited by the appended claims or reasonable equivalents thereof.

What is claimed is:

1. A pressure indicator and inflation device comprising:
   a tubular outer housing having openings at opposite ends thereof, and having a bore extending thereinto from one of the open ends thereof, and further having a counterbore extending thereinto from the other open end thereof to said bore, said housing having an inner wall defining said bore and counterbore, and having air passageway means in said internal wall at the intersection of said bore and counterbore;
   a resilient inner housing positioned slidably within said outer housing adjacent said other open end thereof and in said bore, said inner housing including:
   a cylindrical side wall slidably contacting said outer housing and having threads thereon for securement of the inner housing to the threaded stem of a pneumatic tire;
   an end plate spaced from said cylindrical side wall, extending transversely in said bore and having ports therethrough;
   a first valve core depressor projection projecting from one side of said end plate axially in said bore;
   a second valve core depressor projection projecting from the opposite side of said endplate axially in said bore, said second valve core depressor projection being centrally positioned in said bore opposite the threads on said cylindrical side wall for contacting the valve core of a pneumatic tire when said cylindrical side wall is threaded on the core thereof, and said end plate and core depressor projections are biased toward said cylindrical side wall; and
   a resilient, annular deformable portion interconnecting said cylindrical side wall and said end plate and facilitating, through resilient deformation, movement of said end plate and the valve core depressor projections carried thereby toward and away from said cylindrical side wall;
   piston means slidably positioned within said outer housing and including:
   an elongated pressure indicator element positioned in, and extending axially in, said counterbore; and
   a piston secured to the end of said elongated pressure indicator element nearest said other open end of said tubular outer housing, and dimensioned to sealingly engage the inner wall of said outer housing defining said counterbore; and
   spring means positioned in said outer housing and having one end contacting said piston and the other end contacting a portion of said outer housing adjacent said one open end thereof and resiliently urging said piston away from said one open end of said outer housing and toward the end plate and first valve core depressor projection of said inner housing;
   said spring means being positioned to urge said piston into contact with said first valve core depressor projection when the air pressure is equalized on opposite sides of said piston; and said resilient deformable portion of said inner housing being positioned so as to cooperate with said spring means in urging said piston to an equilibrium position in said counterbore when the air pressure is equalized on opposite sides of said piston and said counterbore in said outer housing is spaced from said end plate of said inner housing.

2. A pressure indicator and inflation device as defined in claim 1 wherein said inner housing and outer housing are each generally cylindrical in configuration, and said inner housing is keyed to said outer housing to prevent relative rotational movement between said housings and about a common axis.

3. A pressure indicator and inflation device as defined in claim 1 wherein said outer housing has an annular shoulder at the intersection of said bore and counterbore, and said inner housing is movable in said outer housing toward and away from said shoulder into contact therewith.

* * * * *